(12) United States Patent
Darbari et al.

(10) Patent No.: US 10,963,611 B2
(45) Date of Patent: Mar. 30, 2021

(54) ASSESSING PERFORMANCE OF A HARDWARE DESIGN USING FORMAL EVALUATION LOGIC

(71) Applicant: Imagination Technologies Limited, Kings Langley (GB)

(72) Inventors: Ashish Darbari, Abbots Langley (GB); Iain Singleton, Hemel Hempstead (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 16/414,594

(22) Filed: May 16, 2019

(65) Prior Publication Data
US 2019/0272349 A1 Sep. 5, 2019

Related U.S. Application Data

(63) Continuation of application No. 15/340,450, filed on Nov. 1, 2016, now Pat. No. 10,331,831.

(30) Foreign Application Priority Data

May 25, 2016 (GB) ..................................... 1609255

(51) Int. Cl.
*G06F 30/3323* (2020.01)
*G06F 30/30* (2020.01)
(Continued)

(52) U.S. Cl.
CPC ...... *G06F 30/3323* (2020.01); *G06F 11/3024* (2013.01); *G06F 11/3409* (2013.01);
(Continued)

(58) Field of Classification Search
USPC ......................................................... 716/106
See application file for complete search history.

(56) References Cited

U.S. PATENT DOCUMENTS 6,092,180 A 7/2000 Anderson et al.
8,739,092 B1 5/2014 Ben-Tzur et al.
(Continued)

OTHER PUBLICATIONS

Bertacco, "Chapter 3 Symbolic Simulation," Scalable Hardware Verification with Symbolic Simulation, Springer, Jan. 1, 2006, pp. 35-50.

(Continued)

*Primary Examiner* — Bryce M Aisaka
(74) *Attorney, Agent, or Firm* — Potomac Law Group, PLLC; Vincent M DeLuca

(57) ABSTRACT

A hardware monitor arranged to assess performance of a hardware design for an integrated circuit to complete a task. The hardware monitor includes monitoring and counting logic configured to count a number of cycles between start and completion of the symbolic task in the hardware design; and property evaluation logic configured to evaluate one or more formal properties related to the counted number of cycles to assess the performance of the hardware design in completing the symbolic task. The hardware monitor may be used by a formal verification tool to exhaustively verify that the hardware design meets a desired performance goal and/or to exhaustively identify a performance metric (e.g. best case and/or worst case performance) with respect to completion of the task.

11 Claims, 8 Drawing Sheets

(51) Int. Cl.
*G06F 30/39* (2020.01)
*G06F 11/30* (2006.01)
*G06F 11/34* (2006.01)
*G06F 11/36* (2006.01)
*G06F 119/18* (2020.01)

(52) U.S. Cl.
CPC ...... *G06F 11/3419* (2013.01); *G06F 11/3466* (2013.01); *G06F 11/3608* (2013.01); *G06F 11/3616* (2013.01); *G06F 11/3636* (2013.01); *G06F 11/3648* (2013.01); *G06F 11/3652* (2013.01); *G06F 30/30* (2020.01); *G06F 30/39* (2020.01); *G06F 2119/18* (2020.01)

(56) References Cited

U.S. PATENT DOCUMENTS

| | | |
|---|---|---|
| 2005/0114809 A1 | 5/2005 | Lu |
| 2005/0166027 A1* | 7/2005 | Uchiyama ........... G06F 12/0802 711/169 |
| 2012/0029900 A1 | 2/2012 | Papariello |
| 2015/0278416 A1 | 10/2015 | Darbari |

OTHER PUBLICATIONS

Breidegard et al., BBDS—a design tool for architectural evaluation and rapid prototyping of performance critical digital systems, Rapid System Prototypnig, Jun. 1992, Los Alamitos, CA, pp. 19-23. (Note: copies of NPL in parent application).

* cited by examiner

ASSESSING PERFORMANCE OF A HARDWARE DESIGN USING FORMAL EVALUATION LOGIC

CROSS-REFERENCE TO RELATED APPLICATIONS AND CLAIM OF PRIORITY

This application is a continuation under 35 U.S.C. 120 of copending application Ser. No. 15/340,450 filed Nov. 1, 2016, which claims priority under 35 U.S.C. 119 from United Kingdom patent application No. 1609255.3 filed May 25, 2016, the disclosures of which are hereby incorporated by reference in their entireties.

BACKGROUND

While an electronic system (e.g. a processor), or a component thereof, is often designed to have a small area footprint and satisfy a low power requirement, it is also important that the electronic system, or the component thereof, meets desired performance goals (e.g. performs one or more desired tasks within a certain time limit). For example, where the electronic system is a processor it may be desirable that the processor executes instructions within a certain time limit.

Since it can be costly to discover, only after the electronic system, or the component thereof, is implemented in hardware (e.g. silicon), that it does not meet desired performance goals, it is beneficial to assess the performance characteristics of the hardware design for the electronic system, or the component thereof, prior to implementing the hardware design in hardware. However, the accuracy of known simulation-based methods for assessing the performance of a hardware design depends on the underlying model and the ability to drive sensible stimulus (e.g. through directed tests or indirectly through executing drivers, operating system boot and other system level tests) to measure the response.

The embodiments described below are provided by way of example only and are not limiting of implementations which solve any or all of the disadvantages of known methods and systems for assessing the performance of a hardware design.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are hardware monitors arranged to assess performance of a hardware design for an integrated circuit to complete a task. The hardware monitors include monitoring and counting logic configured to count a number of cycles between start and completion of a symbolic task in the hardware design; and property evaluation logic configured to evaluate one or more formal properties related to the counted number of cycles to assess the performance of the hardware design in completing the symbolic task. The hardware monitors may be used by a formal verification tool to exhaustively verify that the hardware design meets a desired performance goal and/or to exhaustively identify a performance metric (e.g. best case and/or worst case performance) with respect to completion of the task.

A first aspect provides a hardware monitor arranged to assess performance of a hardware design for an integrated circuit to complete a task, the hardware monitor comprising: monitoring and counting logic configured to count a number of cycles between start and completion of the symbolic task in the hardware design; and property evaluation logic configured to evaluate one or more formal properties related to the counted number of cycles to assess the performance of the hardware design in completing the symbolic task.

A second aspect provides a method of assessing the performance of a hardware design for an integrated circuit to complete a task, the method comprising: receiving the hardware design and a hardware monitor according to the first aspect; formally verifying, using a formal verification tool, the one or more formal properties hold for the hardware design; and outputting an indication of whether or not each of the one or more formal properties was successfully verified, the indication providing an exhaustive assessment of the performance of the hardware design in completing the task.

A third aspect provides a system configured to assess performance of a hardware design for an integrated circuit to complete a task, the system comprising: a memory configured to store: the hardware design; a formal verification tool; and the hardware monitor of any of the first aspect; one or more processors configured to: formally verify, using the formal verification tool, that the one or more formal properties hold for the hardware design; and output an indication of whether or not each of the one or more formal properties was successfully verified, the indication providing an exhaustive assessment of the performance of the hardware design in completing the task.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described, by way of example, with reference to the following drawings, in which.

Figure 1:
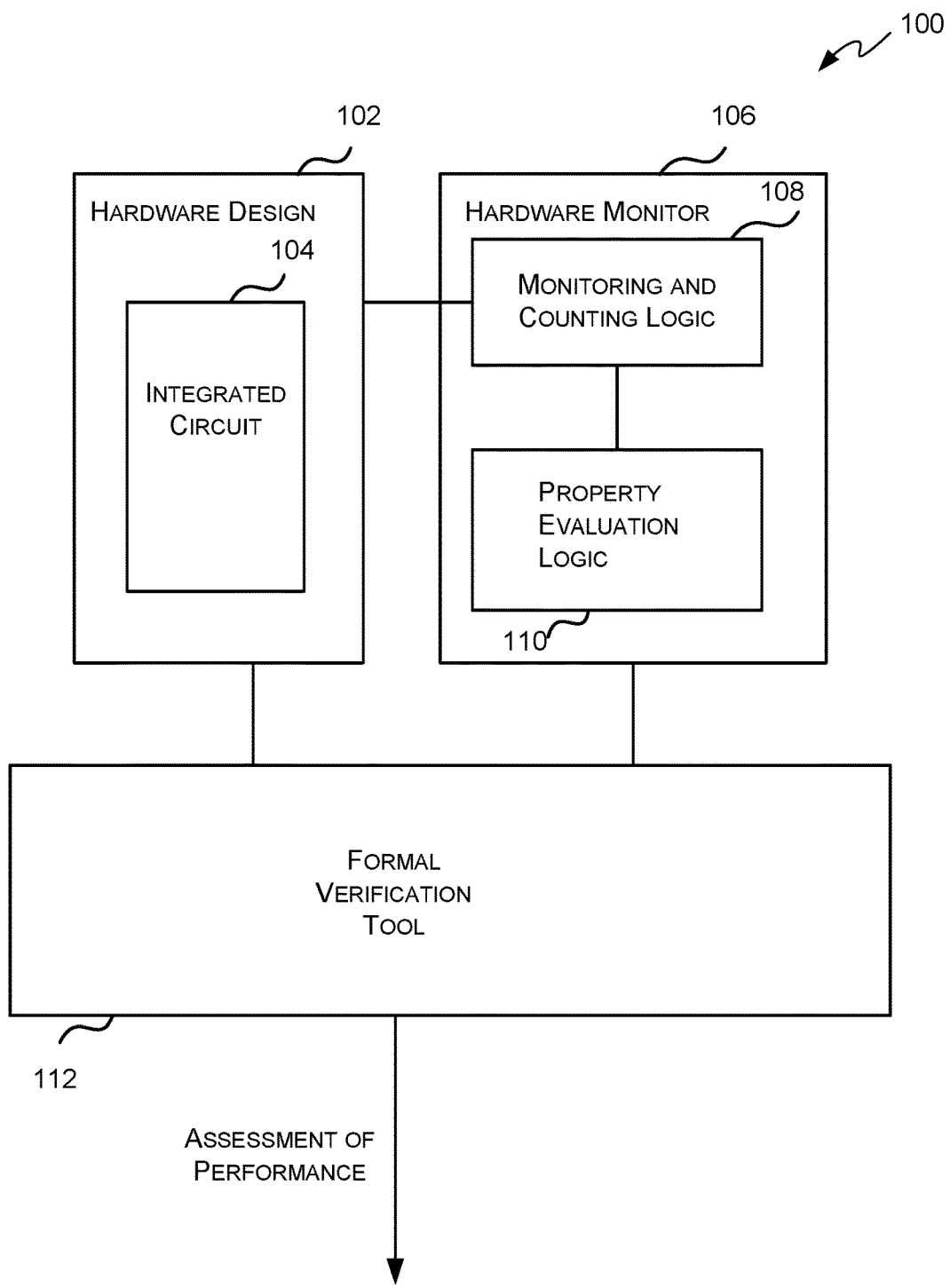
FIG. 1 is a block diagram of an example system for assessing the performance of a hardware design for an integrated circuit to complete a task.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Embodiments described herein relate to methods, hardware monitors, and systems for assessing the performance of a hardware design to complete a task using formal verification (which may be referred to herein simply as "formal"). Assessing the performance of a hardware design to complete a task may comprise verifying that that the hardware design meets a performance goal in completing the task and/or identifying a performance metric for completing the task.

The term "performance goal" is used herein to mean a quantified objective related to completion of the task and includes, but is not limited to, completion of the task within a predetermined number of clock cycles, and, completion of the task by within a predetermined range of clock cycles. The term "performance metric" is used herein to mean a measureable criterion related to completing the task, and includes, but is not limited to, the worst case (or highest) number of clock cycles to complete the task, and, the best case (or lowest) number of clock cycles to complete the task.

The hardware monitors described herein are configured to count the number of cycles (e.g. clock cycles) between the start and completion of the task in the hardware design; and evaluate one or more formal properties related to the counted number of cycles to assess the performance of the hardware design in completing the task. A formal verification tool can then be used to formally verify that the one or more formal properties hold for all valid states of the hardware design to exhaustively assess the performance of the hardware design in completing the task.

In formal verification, the hardware design is transformed into a mathematical model (e.g. a state-transition system) and the properties to be verified are expressed using mathematical logic using a precise syntax or a language with a precise mathematical syntax and semantics. A property is then verified by searching the entire reachable state space of the hardware design without explicitly traversing the state machine. Since formal verification algorithmically and exhaustively explores all input values over time, verifying properties in this manner allows a property to be exhaustively proved or disproved for all valid states. In the embodiments described herein formal verification allows exhaustive assessment of the performance of the hardware design in completing the task. In other words it allows (i) exhaustive verification that the hardware design meets a performance goal with respect to the task, and/or (ii) identification of an absolute performance metric with respect to the task.

Reference is now made to FIG. 1 which illustrates an example system 100 for exhaustively assessing the performance of a hardware design for an integrated circuit to complete a task. The system 100 comprises a hardware design 102 for an integrated circuit 104; a hardware monitor 106 comprising monitoring and counting logic 108 for monitoring events in the hardware design 102 and counting the number of cycles between a start event and a stop event, and property evaluation logic 110 for evaluating one or more formal properties related to the counted number of cycles to assess the performance of the hardware design 102 in completing the task; and a formal verification tool 112 configured to use the hardware monitor 106 to exhaustively assess the performance of the hardware design 102 in completing the task.

The term "hardware design" is used herein to refer to a description of an integrated circuit for all or part of an electronic system (e.g. a processor) which can be used to generate a hardware manifestation of the integrated circuit (e.g. the hardware design may be synthesised into silicon or used to program a field-programmable gate array (FPGA)). The hardware design may relate to a module, block, unit, sub-system, system or any combination thereof of an electronic system (e.g. processor).

The hardware design 102 may be implemented in a high level hardware description language (HDL), such as, but not limited to, a register transfer language (RTL). Examples of register transfer languages include, but are not limited to, VHDL (VHSIC Hardware Description Language) and Verilog. It will be evident to a person of skill in the art that other high level hardware description languages may be used such as proprietary high level hardware description languages.

The integrated circuit 104 defined by the hardware design 102 is configured to perform one or more tasks. The term "task" is used herein to mean any transaction that is executed by the integrated circuit 104 that has an identifiable start state and an identifiable end state. For example, where the integrated circuit forms a pipelined central processing unit (CPU), a task may include, but is not limited to, completion of a stage of the pipeline—e.g. fetching an instruction from a memory or an instruction cache; reconciling branch instructions (e.g. identifying the target of a branch instruction); decoding a specific instruction; executing a specific instruction; or writing back the results of an executed instruction to memory or register(s).

The hardware monitor 106 is a module configured to: monitor the operation of the hardware design 102 to identify the start and end of a symbolic task; count the number of cycles (e.g. clock cycles) between start of the symbolic task and end of the symbolic task; and, assess the performance of the hardware design 102 in performing the symbolic task based on the counted number of cycles.

In the example of FIG. 1, the hardware monitor 106 comprises monitoring and counting logic 108 and property evaluation logic 110. The monitoring and counting logic 108 is configured to monitor one or more control signals and/or data signals of the hardware design 102 to identify the start and end of a symbolic task; and to count the number of cycles (e.g. clock cycles) between the start and end of the symbolic task.

As described above, a task is a transaction executed by the integrated circuit that has an identifiable start state and an identifiable end state. For example, where the integrated circuit forms a processor, a task may be execution of an instruction with a particular operational code (opcode), and the start of the task may be when an instruction with the particular opcode has been decoded, and the end of the task may be when the instruction with the particular opcode has been executed. In another example, where the integrated circuit forms a two input adder which accepts two 32-bit integer data words a and b and adds them together, a task may be addition of a and b when a and b are specific values and the start of the task may be when the specific values appear on the input of the adder, and the end of the task may be when the corresponding output appears.

A symbolic task is a means of representing a set or group of tasks using one or more symbolic variables. As is known to those of skill in the art a symbolic variable represents a set of, or a plurality of, values (also referred to as scalar values which are defined by a specific combination of zeros and ones). For example, where the integrated circuit forms a processor, a symbolic task may be an execution of an instruction with a symbolic opcode where the symbolic opcode represents all of the possible opcodes (e.g. all of the possible scalar opcodes). In this way the symbolic task represents execution of all instructions with any possible opcode. In another example, where the integrated circuit forms a two input adder which accepts two 32-bit integer data words a and b and adds them together, a symbolic task may be addition of symbolic input a and symbolic input b, where the symbolic input a represents all possible values of input a (e.g. all of the possible scalar inputs) and symbolic input b represents all possible values of input b (e.g. all of the possible scalar inputs). In this way the symbolic task represents the addition of all possible input values.

Accordingly, instead of listing each possible state, using for example the scalar representation, one at a time, a symbolic variable allows a plurality of states to be represented or encoded at once. This may allow the state space to be traversed much more efficiently by considering a number of states at a single step. An example implementation of the monitoring and counting logic 108 will be described with reference to FIG. 3.

The property evaluation logic 110 evaluates one or more formal properties based on the counted number of cycles to assess the performance of the hardware design 102 in completing the symbolic task. The one or more properties may, for example, be configured to verify whether a performance goal is met (e.g. that the hardware design 102 always complete the tasks within a predetermined number of clock cycles) or to identify a performance metric of the hardware design 102 in completing the task (e.g. the maximum number of clock cycles to complete the task).

As is known to those of skill in the art, a formal property is a statement or expression that captures design behavior. For example, a simple formal property may be a=b. Within HDL designs, a formal property is an executable statement that checks for specific behavior within the HDL design. For example, if a design contains a FIFO (first in first out) buffer a formal property may be that neither overflow nor underflow of the FIFO may occur.

Formal properties are used to capture required or desired temporal behavior of the hardware design in a formal and unambiguous way. The hardware design can then be verified to determine that it conforms to the required or desired behavior as captured by one or more properties.

Formal properties are typically written in an assertion language. An assertion language, which also may be referred to as a property language, captures the design behavior over multiple design cycles in a concise, unambiguous manner. While traditional hardware description languages (HDL), such as VHDL or Verilog RTL, have the ability to capture individual cycle behavior, they are too detailed to describe properties at a higher level. In particular, assertion languages provide means to express temporal relationships and complex design behaviors in a concise manner. Assertion languages include, but are not limited to, SystemVerilog Assertions (SVA), Property Specification Language (PSL), Incisive® Assertion Library (IAL), Synopsys® OpenVera™ Assertions (OVA), Symbolic Trajectory Evaluation (STE), Hardware Property Language (HPL), 0-In®, and Open Verification Library (OVL).

A formal property may be asserted or covered. When a formal property is asserted it must always be true. In contrast, when a property is covered the property must be true at least once, but is not required to be true always. An asserted property is said to form an assertion. An example assertion of the property a=b is assert property (a=b). Similarly a covered property is said to form a cover. An example cover of the property a=b is cover property (a=b).

Formal properties are typically 'clocked', meaning that that they are only evaluated upon a clock event occurring (e.g. upon the positive edge of a clock signal or the negative edge of a clock signal). Accordingly, assertions or covers generally indicate which clock and which clock edge triggers evaluation of the formal property. An example SVA assertion of the formal property a=b is as follows:

assert property (@(posedge clk) a==b);

It will be evident to a person of skill in the art that in the example SVA assertion above the formal property a==b will be evaluated on the positive edge (posedge) of the clock signal (cik).

In the system of FIG. 1 the property evaluation logic 110 is configured to evaluate at least one formal property related to the counted number of cycles (e.g. clock cycles) between start and end of a symbolic task to verify a performance goal and/or to identify a performance metric related to the symbolic task.

Where the system 100 is being used to exhaustively verify that a performance goal is met then the property evaluation logic 110 may be configured to evaluate an assertion. In some cases, where the performance goal is that the hardware design 102 always executes the task within a predetermined number of clock cycles, the property evaluation logic 110 may be configured to evaluate an assertion that asserts that the counted number of clock cycles is less than the predetermined number of clock cycles. For example, the property evaluation logic 110 may be configured to evaluate an assertion that the counted number of clock cycles is less than or equal to N where N is the worst case allowed performance for the task.

Where the system 100 is being used to identify a performance metric (e.g. minimum or maximum number of clock cycles to complete a task) then the property evaluation logic 110 may be configured to evaluate one or more assertions or covers to identify the performance metric.

In some cases, where the system 100 is being used to identify the maximum number of clock cycles to complete a task then the property evaluation logic 110 may be configured to evaluate a plurality of covers each of which states that the counted number of clock cycles is equal to a different number within a range of numbers. For example, the property evaluation logic 110 may be configured to evaluate a cover that states the counter is equal to 20, a cover that states the counter is equal to 21, a cover that states that the counter is equal to 22, and so on up to a cover that states the counter is equal to 30. In this way, if the worst case performance is likely to be between 20 and 30 cycles the exact number between 20 and 30 can be identified.

In other cases, the property evaluation logic 110 may be configured to evaluate a cover that states that the counter is greater than 20 and less than or equal to 30.

It will be evident to a person of skill in the art that these are examples only and that the property evaluation logic 110 may be configured to evaluate any number of assertions and/or covers to assess the performance of a hardware design in completing a task (i.e. to verify a performance goal and/or to identify a performance metric).

The hardware monitor 106 may be implemented in software. For example, the hardware monitor 106 may be implemented using a hardware description language (HDL) or an assertion language (e.g. SystemVerilog Assertions (SVA)).

The hardware monitor 106 is bound to the hardware design 102 to monitor the completion of tasks. Where the hardware monitor 106 is implemented in SVA and the hardware design 102 is implemented in RTL, the SVA code is bound to the RTL code.

The hardware design 102 (e.g. RTL), hardware monitor 106 (e.g. SVA), and bindings, are loaded into a formal verification tool 112. The formal verification tool 112 is a software tool that is capable of performing formal verification of a hardware design. Examples of formal verification tools include, but are not limited to, Mentor Graphics Questa® Formal Verification, Synopsys VC Formal, Cadence® Incisive® Enterprise Verifier, JasperGold®, and OneSpin 360 DV™.

Formal verification is a systematic process that uses mathematical reasoning to verify a property in a hardware design. Formal verification can be contrasted to simulation-based verification in which a hardware design is tested by applying stimuli to the hardware design and monitoring the output of the hardware design in response to the stimuli.

In formal verification the hardware design (e.g. hardware design 102) is transformed into a mathematical model (e.g. a state-transition system) and the formal properties (e.g. those evaluated by the property evaluation logic 110) are expressed using mathematical logic using a precise syntax or a language with a precise mathematical syntax and semantics.

A formal property is verified by searching the entire reachable state space of the hardware design (e.g. state transition system) without explicitly traversing the state machine. The search is done by, for example, encoding the states using efficient Boolean encodings using Binary decision diagrams (BDDS), or using advanced SAT (satisfiability-based bounded model checking) based techniques. In some cases tools can be used to implement techniques, such as, but not limited to, abstraction, symmetry, symbolic indexing, and invariants to improve performance and achieve scalability.

A formal property that is covered is verified by searching the reachable state space of the hardware design (e.g. state transition system) for at least one valid state (as defined by formal constraints) in which the property is true. Once a valid state is found in which the property is true then the searching ceases. In contrast, a formal property that is asserted is verified by confirming the property is true for all valid states (as defined by formal constraints). In other words, an asserted property is verified by searching the reachable state space of the hardware design for a valid state in which the property is not true. Since formal verification of an asserted property algorithmically and exhaustively explores all valid input values over time, verifying an asserted property in this manner allows a property to be exhaustively proved or disproved for all valid states.

When the formal verification tool 112 is used to verify an assertion, the formal verification tool 112 may output an indication of whether or not the assertion is valid (i.e. is true for all valid states), which may also be referred to herein as the assertion being successfully verified. The output may be yes the assertion is valid or has been successfully verified; no the assertion is not valid (i.e. it is not true or has failed for at least one valid state) or has not been successfully verified; or the formal verification was inconclusive. The formal verification may be inconclusive, for example, because the computing-based device running the formal verification tool 112 has run out of memory or because the formal verification tool 112 has determined that a certain amount of progress has not been made after a predefined period of time.

Where an assertion is not valid or has not been successfully verified, the formal verification tool 112 may output information indicating a state of the hardware design in which the assertion was false. For example, the formal verification tool 112 may output a trace of the verification indicating at what point or state the failure occurred.

The formal verification tool 112 is configured to formally verify the one or more properties defined in the hardware monitor 106 hold or are true for all of the tasks covered by the symbolic task. For example, where the symbolic task is execution of an instruction with a symbolic opcode, the formal verification tool 112 is configured to formally verify the one or more properties defined in the hardware monitor 106 hold for each possible opcode.

Figure 2:
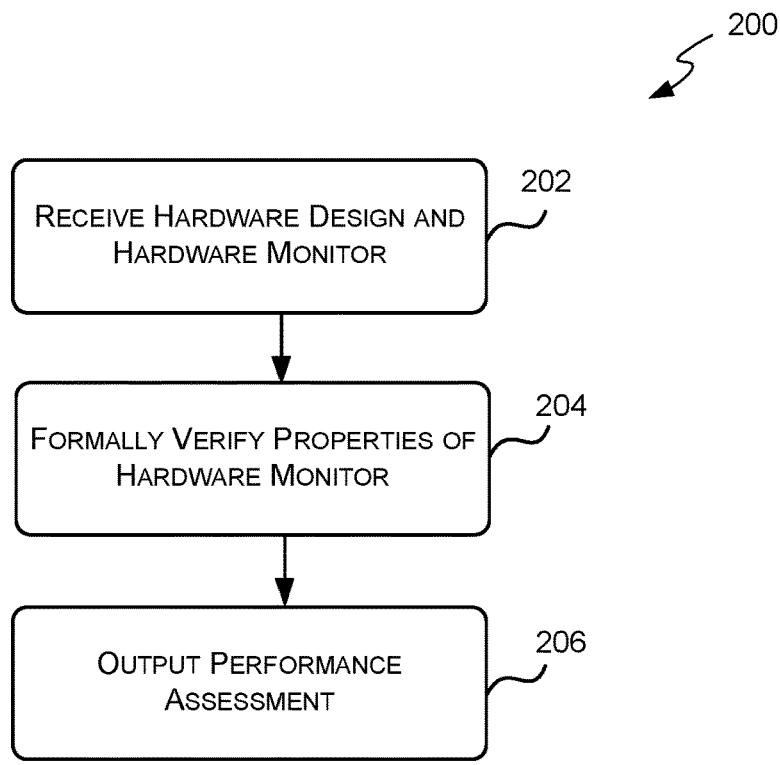
FIG. 2 is a flow diagram of an example method for assessing, using the system of FIG. 1, the performance of a hardware design to complete a task.

Reference is now made to FIG. 2 which illustrates a flow diagram of an example method 200 for exhaustively assessing the performance of a hardware design 102 in completing a task. The method 200 may be implemented on a computing-based device, such as the computing-based device 700 described below with reference to FIG. 7.

The method 200 begins at block 202 where the hardware design 102 and the hardware monitor 106 are received at the computing-based device 700. As described above, the hardware design 102 defines an integrated circuit to perform one or more tasks; and the hardware monitor 106 is configured to count the number of cycles (e.g. clock cycles) between starting and completing a symbolic task, and assess the performance of the hardware design in completing the task by evaluating one or more formal properties related to the counted number of cycles (e.g. clock cycles).

As described above, one or more of the formal properties in the hardware monitor 106 may be asserted and/or one or more of the formal properties in the hardware monitor 106 may be covered. Where a property is asserted it must be true for all possible states and where a property is covered it must be true at least once, but does not have to always be true.

The specific properties and whether they are asserted or covered are configured to provide an exhaustive assessment of the performance of the hardware design in completing the task. The assessment may be an exhaustive verification that the hardware design meets a performance goal (e.g. always completes the task within a predetermined number of clock cycles); or may be identification of a performance metric (e.g. a minimum or maximum number of clock cycles to complete the task).

Once the hardware design 102 and the hardware monitor 106 have been received the method 200 proceeds to block 204.

At block 204, the formal verification tool 112, formally verifies that the properties defined in the hardware monitor 106 hold (or are true) for the hardware design 102.

Formally verifying an asserted property (i.e. an assertion) comprises verifying that for all valid states of the hardware design 102 (as defined by the formal constraints) that the property is true. For example, verifying an assertion that the counted number of clock cycles is less then N comprises determining whether there is a state of the hardware design 102 wherein the counted number of clock cycles is greater than or equal to N.

Where an asserted property relates to a symbolic variable (e.g. a symbolic task) formally verifying the asserted property comprises verifying that the property is true for all valid values of the symbolic variable. In this way the formal verification tool 112 exhaustively verifies the property for all possible values of the symbolic variable. For example, where the symbolic task is execution of an instruction with a symbolic opcode representing all possible opcodes, and the hardware monitor defines an assertion that the counter (representing the number of clock cycles to execute the instruction with the symbolic opcode) is less than a predetermined number of clock cycles, the formal verification tool 112 verifies that for all instructions with a possible opcode the counter is less than the predetermined number of clock cycles. If there is even one instruction with any possible opcode where the counter is greater than or equal to the predetermined number of clock cycles then the assertion will fail.

Formally verifying a covered property (i.e. a cover) comprises verifying that there is at least one valid state of the hardware design 102 (as defined by the formal constraints) that the property is true. For example, verifying a cover that the counted number of clock cycles is equal to N comprises determining whether there is a state of the hardware design 102 wherein the counted number of clock cycles is equal to N.

Where a covered property relates to a symbolic variable (e.g. a symbolic task) the cover will be verified if the formal verification tool 112 can identify, for any possible value of the symbolic variable, that the property is true. For example, where the symbolic task is an execution of an instruction with a symbolic opcode representing all possible opcodes, and the hardware monitor 106 defines a cover that the counter (representing the number of clock cycles to execute the instruction with the symbolic opcode) is equal to a predetermined number, if the formal verification tool 112 is able to identify an instruction with any possible opcode where the counter is equal to the predetermined number then the cover will be verified.

Once the formal verification ends the method 200 proceeds to block 206.

At block 206, the formal verification tool 112 outputs an indication of whether the properties were successfully verified or not. This indication provides an assessment of the performance of the hardware design 102 in completing the task. As described above, the indication may: prove that the hardware design 102 meets a performance goal; and/or identify a performance metric (e.g. the minimum number of clock cycles to complete the task and/or the maximum number of clock cycles to complete the task).

Where the property is asserted the formal verification tool 112 may output an indication that it has been successfully verified (i.e. that it is true for all possible states) or that it has not been successfully verified (i.e. that it is not true for at least one state). Where the asserted property has not been successfully verified the formal verification tool 112 may also output an indication of a state of the hardware design 102 in which the property was not true. Similarly where the property is covered the formal verification tool 112 may output an indication that it has been successfully verified (i.e. that it is true for a least one state) or that it has not been successfully verified (i.e. that it is not true for any state). Where the covered property has been successfully verified the formal verification tool 112 may also output an indication of a state of the hardware design 102 in which the property was true.

Figure 3:
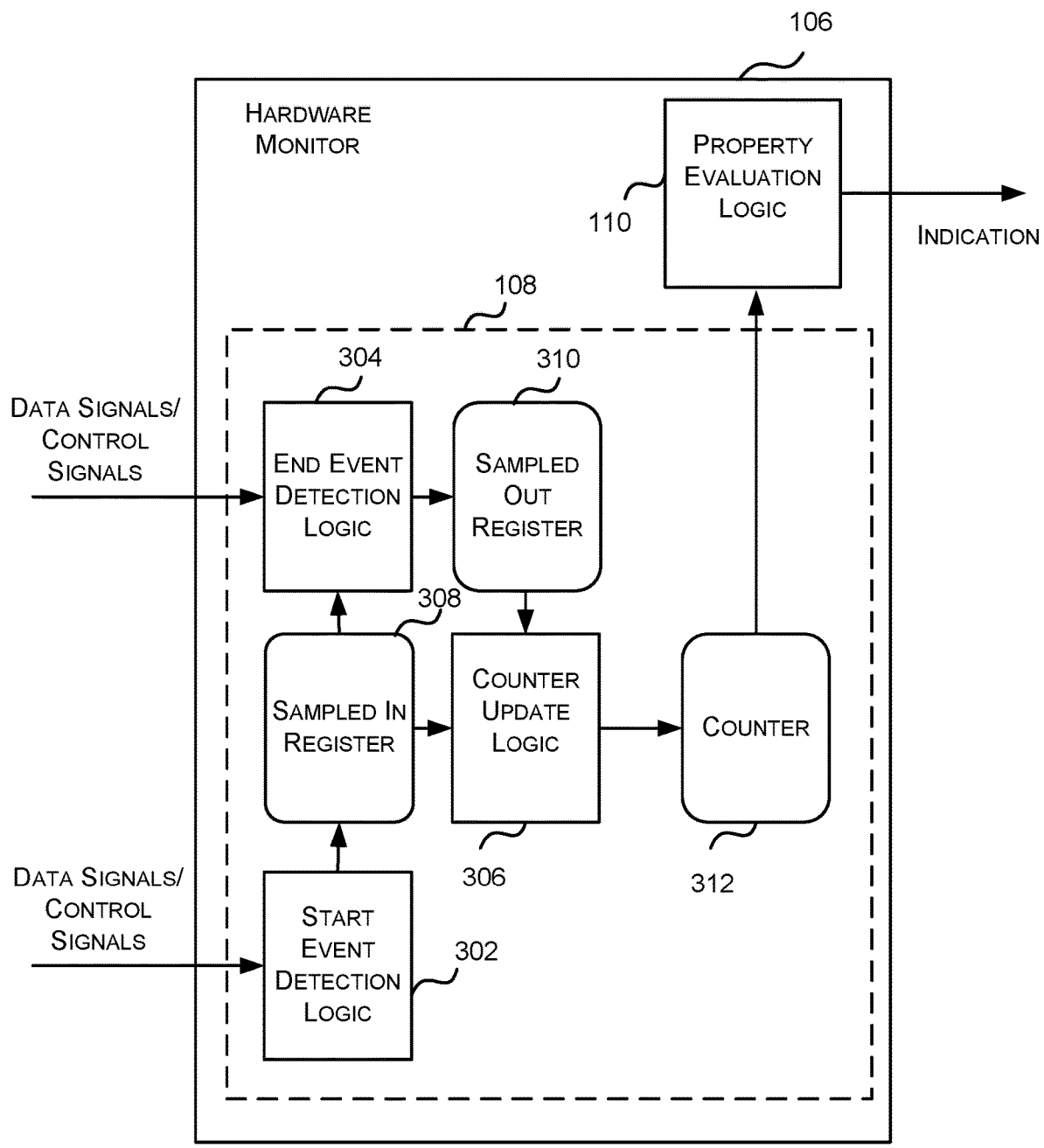
FIG. 3 is a block diagram of a first example implementation of the hardware monitor of FIG. 1.

Reference is now made to FIG. 3 which illustrates an example implementation of the hardware monitor 106 of FIG. 1. As described above, the hardware monitor 106 comprises monitoring and counting logic 108 for counting the cycles (e.g. clock cycles) between the start and end of a symbolic task in a hardware design 102; and property evaluation logic 110 for evaluating one or more formal properties based on the count of cycles (e.g. clock cycles) to assess the performance of the hardware design 102 in completing the task.

The monitoring and counting logic 108 comprises start event detection logic 302 for detecting the start of a symbolic task in the hardware design 102; end event detection logic 304 for detecting the completion of the symbolic task in the hardware design 102; and counter update logic 306 for counting the number of clock cycles between the start event and the end event.

The start event detection logic 302 monitors one or more control signals and/or data signals of the hardware design 102 to detect a start event indicating the start of a symbolic task. The specific control signals and/or data signals that will be monitored, and the status thereof indicating a start event has occurred, will vary depending on the task being monitored and the configuration of the hardware design 102. For example, as described in more detail below, where the task is execution of an instruction by a processor, the start event detection logic 302 may be configured to monitor the output of a fetch stage or a decode stage of the processor to determine when a symbolic instruction has been fetched or decoded. When the start event detection logic 302 detects the start event (indicating the start of the symbolic task), the start event detection logic 302 may set a sampled in register 308 to indicate that the task has started.

The end event detection logic 304 monitors one or more control signals and/or data signals of the hardware design 102 to detect an end event indicating the completion of the symbolic task in the hardware design 102. The specific control signals and/or data signals that will be monitored, and the status thereof indicating an end event has occurred, will vary depending on the task being monitored and the configuration of the hardware design 102. For example, as described in more detail below, where the task is execution of an instruction by a processor, the end event detection logic 304 may be configured to monitor the output of an execution stage of the processor to determine when a symbolic instruction has been executed. When the end event detection logic 304 detects the end event (indicating completion of the symbolic task) the end event detection logic 304 may set a sampled out register 310 to indicate that the task has been completed.

In some cases, the end event detection logic 304 is configured to only set the sampled out register if it detects the end event and the start event has already been detected. The end event detection logic 304 may be configured to determine that the start event has been detected based on the status of the sampled in register 308. For example, in some cases, the end event detection logic 304 may be configured to only set the sampled out register 310 if the end event is detected and the sampled in register 308 is set.

The counter update logic 306 is configured to count the number of cycles (e.g. clock cycles) between the start event and the end event. In other words, the counter update logic 306 counts the number of cycles (e.g. clock cycles) it takes to complete the symbolic task defined by the start event and the end event.

The counter update logic 306 may be configured to, each cycle (e.g. clock cycle), determine whether the start event has been detected (e.g. from the state of the sampled in register 308). If the start event has been detected then the counter update logic 306 may be configured to determine whether the end event has been detected (e.g. from the state of the sampled out register 310). If the end event has not been detected then the counter update logic 306 may increment a counter 312. If, however, the end event has been detected then the counter update logic 306 does not increment the counter 312.

The property evaluation logic 110 evaluates (e.g. periodically, such as, each cycle) one or more properties related to the value of the counter 312 to assess the performance of the hardware design in completing the task. The assessment may be, for example, verification that the hardware design always performs the task within a predetermined number of clock cycles; or identification of a performance metric (e.g. the minimum and/or maximum number of clock cycles for the hardware design 102 to complete the task).

For example, if the hardware monitor is designed to verify that the hardware design 102 always performs the task within N clock cycles then the property may state or express that the counter 312 is less than or equal to N. As described above, a property may be asserted or covered. If the property evaluation logic 110 determines that an asserted property is not true then the property evaluation logic 110 may output an indication that the property is not true. Conversely, if the property evaluation logic 110 determines that a covered property is true then the property evaluation logic 110 may output an indication that the property is true.

Although, not shown in FIG. 3, it will be evident to a person of skill in the art that the logic blocks (e.g. start event detection logic 302, end event detection logic 304, counter update logic 306 and property evaluation logic 110) may be triggered by a clock. For example, one or more of the logic blocks may be triggered by the rising or positive edge of the clock. Furthermore, it will be evident to a person of skill in the art that one or more of the logic blocks (e.g. start event detection logic 302, end event detection logic 304, counter update logic 306 and property evaluation logic 110) may be combined or their functionality may divided between logic blocks in another manner.

Figure 4:
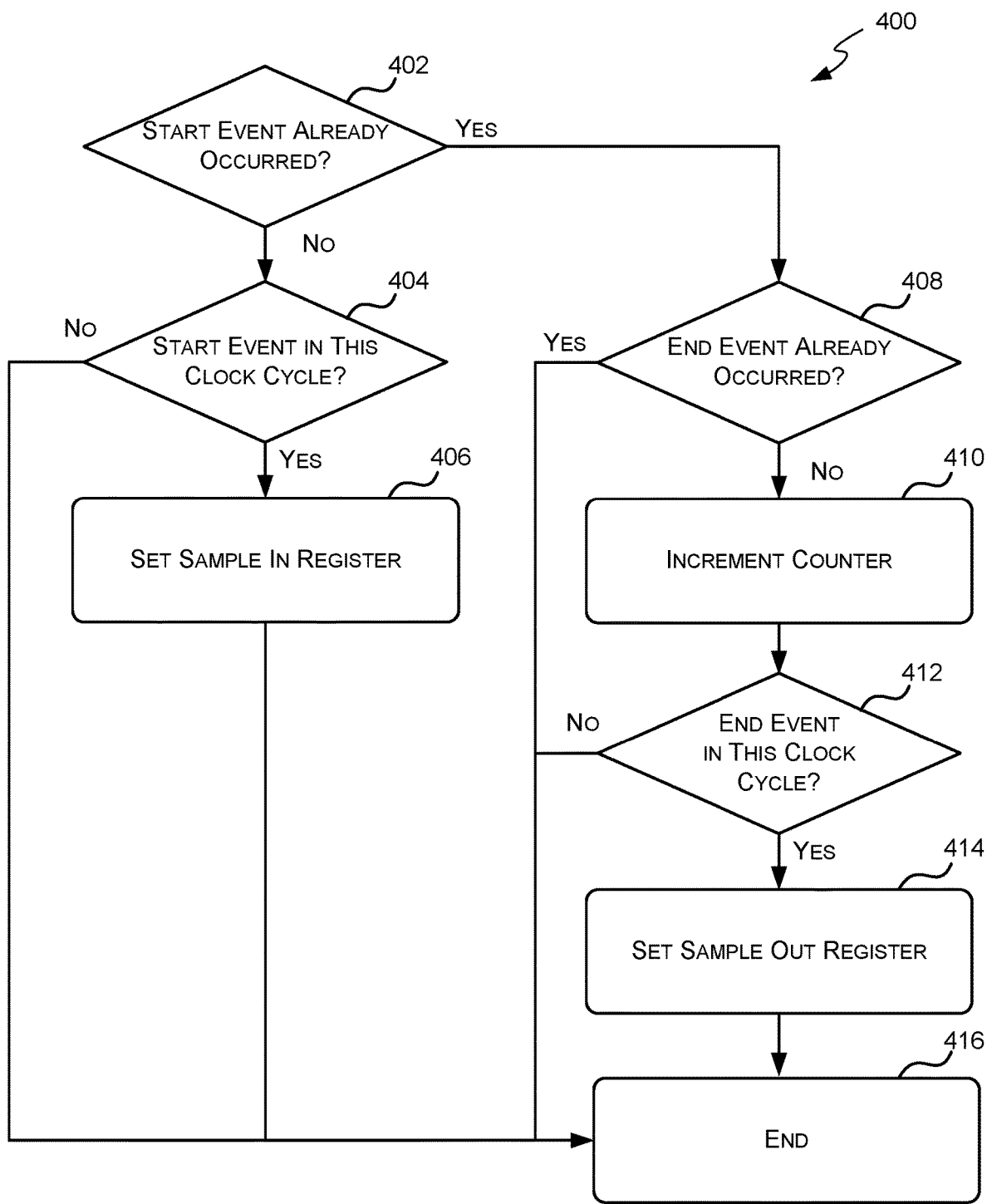
FIG. 4 is a flow diagram of an example method for assessing, using the hardware monitor of FIG. 3, the performance of a hardware design to complete a symbolic task.

Reference is now made to FIG. 4 which illustrates an example method 400 for assessing the performance of a hardware design in completing a symbolic task which may be implemented by the hardware monitor 106 of FIG. 3 each cycle (e.g. clock cycle). The method 400 begins at block 402 where the start event detection logic 302 determines whether a start event has already been detected. The start event detection logic 302 may be configured to determine whether a start event has already been detected based on the state of the sampled in register 308. If the start event detection logic 302 determines that a start event has already been detected then the method proceeds to block 408. If, however, the start event detection logic 302 determines that a start event has not already been detected then the method 400 proceeds to block 404.

At block 404, the start event detection logic 302 determines whether a start event has occurred in the current cycle (e.g. clock cycle). In some cases determining whether a start event has occurred in the current cycle (e.g. clock cycle) comprises sampling one or more controls signals and/or data signals of the hardware design 102 and determining whether the one or more control signals and/or data signals are in a predetermined state. The specific control signals and/or data signals, and the state or configuration thereof, that indicate a start event depends on the particular task being assessed and the configuration of the hardware design 102.

If the start event detection logic 302 determines that a start event has occurred in the current cycle (e.g. clock cycle) then the method 400 proceeds to block 406. If, however, the start event detection logic 302 determines that a start event has not occurred in the current cycle (e.g. clock cycle) then the method 400 ends 416.

At block 406, the start event detection logic 302 sets the sampled in register 308 to indicate that a start event has been detected. In some cases the start event detection logic 302 is configured to set the sampled in register 308 to "1" to indicate that a start event has been detected. However, it will be evident to a person of skill in the art that the sampled in register 308 can be set to any other value to indicate that a start event has been detected. Once the sampled in register 308 has been set the method 400 ends 416.

At block 408, the end event detection logic 304 determines whether an end event has already been detected. The end event detection logic 304 may be configured to determine whether an end event has already been detected based on the state of the sampled out register 310. If the end event detection logic 304 determines that an end event has already been detected then the method 400 ends 416. If, however, the end event detection logic 304 determines that an end event has not already been detected then the method 400 proceeds to block 410.

At block 410, the counter update logic 306 increments the counter 312 to indicate that one additional cycle (e.g. clock cycle) has elapsed since the start event was detected and before the end event was detected. Once the counter update logic 306 has incremented the counter 312, the method 400 proceeds to block 412.

At block 412, the end event detection logic 304 determines whether an end event has occurred in the current cycle (e.g. clock cycle). In some cases, determining whether an end event has occurred in the current cycle (e.g. clock cycle) comprises sampling one or more controls signals and/or data signals and determining whether one or more control signals and/or data signals are in a predetermined state. The specific control signals and/or data signals, and the state or configuration thereof, that indicate an end event depends on the particular task being assessed and the configuration of the hardware design 102.

If the end event detection logic 304 determines that an end event has occurred in the current cycle (e.g. clock cycle) then the method 400 proceeds to block 414. If, however, the end event detection logic 304 determines that an end event has not occurred in the current cycle (e.g. clock cycle) then the method 400 ends 416.

At block 414, the end event detection logic 304 sets the set sampled out register 310 to indicate that an end event has been detected. In some cases the end event detection logic 304 is configured to set the sampled out register 310 to "1" to indicate that an end event has been detected. However, it will be evident to a person of skill in the art that the sampled out register 310 can be set to any other value to indicate that an end event has been detected. Once the sampled out register 310 has been set the method 400 ends 416.

Figure 5:
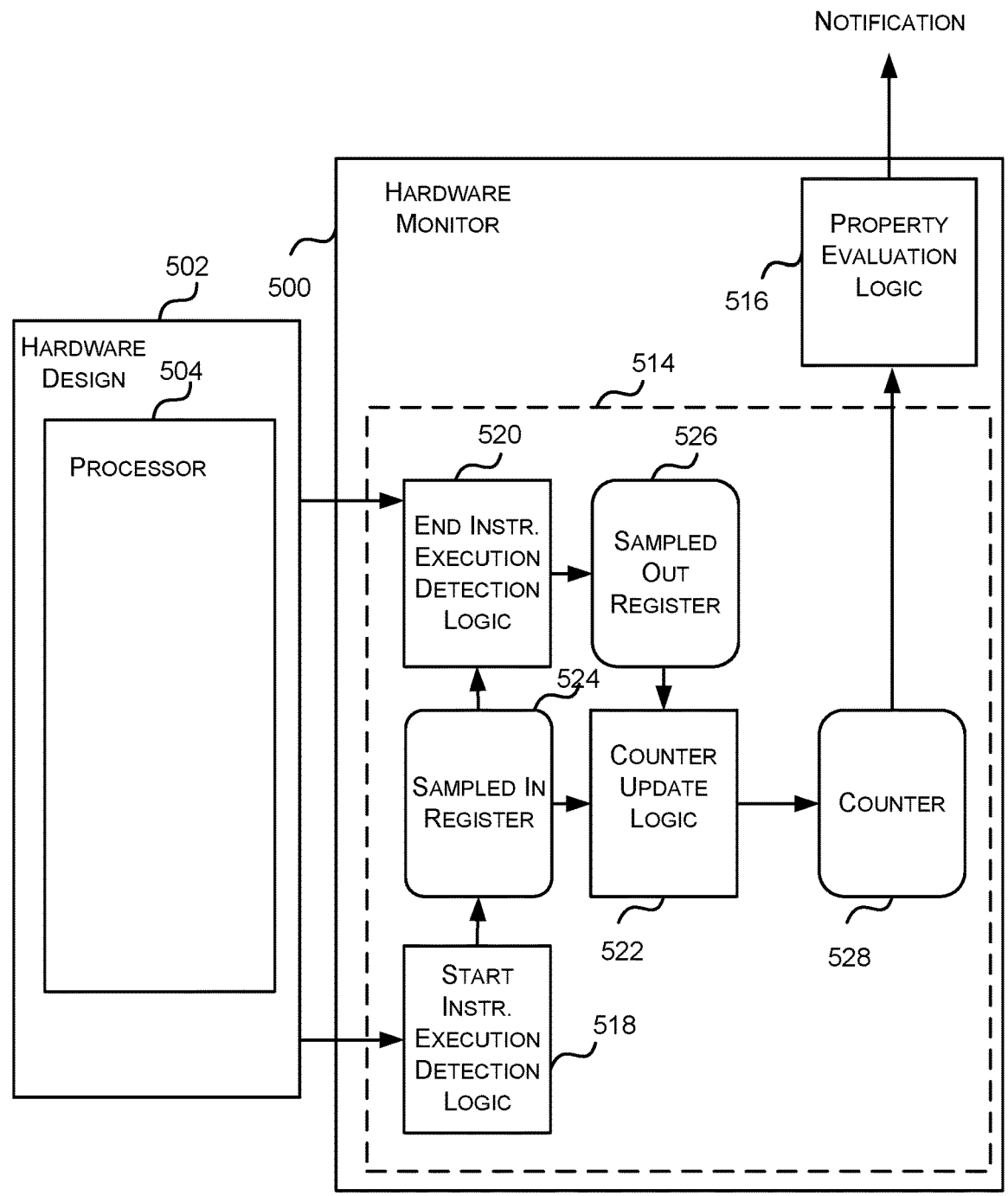
FIG. 5 is a block diagram of a second example implementation of the hardware monitor of FIG. 1 to assess the performance of a hardware design for a processor to execute instructions.

Reference is now made to FIG. 5 which illustrates an example implementation of a hardware monitor 500 (which can be used as hardware monitor 106 of FIG. 1) for assessing the performance of a hardware design 502 for a processor 504 in executing instructions. As is known to those of a skill in the art a processor fetches instructions from a program, decodes the fetched instructions, executes the decoded instructions, and stores the results of the executed instructions in memory and/or registers. The hardware monitor 500, like the hardware monitor 106 of FIGS. 1 and 3, comprises monitoring and counting logic 514 and property evaluation logic 516.

The monitoring and counting logic 514, like the monitoring and counting logic 108 of FIGS. 1 and 3, is configured to detect when a start event has occurred and when a stop event has occurred; and count the number of cycles between the start event and the stop event. In this example the start event is either when a symbolic instruction has been fetched or when a symbolic instruction has been decoded, and the end event is when the symbolic instruction has been executed. The monitoring and counting logic 514 then counts the number of clock cycles between the symbolic instruction being fetched (or decoded) and the symbolic instruction being executed.

The monitoring and counting logic 514 comprises start instruction execution detection logic 518 for detecting that a symbolic instruction has been fetched (or that a symbolic instruction has been decoded); end instruction execution detection logic 520 for detecting that the symbolic instruction has been executed; and counter update logic 522 for counting the number of clock cycles between the fetch/decode of the symbolic instruction and execution of the symbolic instruction.

The start instruction execution detection logic 518 is configured to monitor one or more control signals and/or data signals of the hardware design 502 to detect when a symbolic instruction has been fetched (or when a symbolic instruction has been detected). In some examples, the symbolic instruction is an instruction with a particular opcode. In these examples, the start instruction execution detection logic 518 may be configured to detect that the symbolic instruction has been fetched/decoded when an instruction with the particular opcode has been fetched/decoded. In other examples, the symbolic instruction may be defined by another property, such as instruction address.

When the start instruction execution detection logic 518 detects the start event (i.e. that the symbolic instruction has been fetched or decoded) the start instruction execution detection logic 518 may set a sampled in register 524 to indicate that the task (execution of the instruction) has started.

Where the processor 504 is single-threaded, in-order and unpipelined the processor processes a single instruction at a time (i.e. the processor fetches, decodes, and executes a single instruction before it fetches, decodes and executes the next instruction) the start instruction execution detection logic 518 may be configured to detect that the symbolic instruction has been decoded when the processor is currently decoding an instruction with the particular opcode. The following is example SVA code for implementing such start event detection logic where sampled_in is the sampled in register 524, current_state is the current state of the processor (e.g. fetching, decoding, or executing), opcode is the opcode of the instruction currently being processed by the processor 504:

```
always @(posedge clk or negedge resetn)
    if (!resetn)
        sampled_in <= 1'b0;
    else if ((current_state == decode) && (opcode == watched_instruction))
        sampled_in <= 1'b1;
```

It will be evident to a person of skill in the art that the above SVA code causes the sampled in register (sampled_in) to be set to zero after a reset (!resetn) and set to one if the processor is decoding (current_state==decode) an instruction with the specific opcode (opcode==watched_ instruction).

It will be evident to a person of skill in the art that this is an example only and that the start instruction execution detection logic 518 may be configured to detect that a symbolic instruction has been decoded in another manner. For example, in other examples where the processor is a pipelined processor, the start instruction execution detection logic 518 may be configured to monitor the output of a decode stage of the processor to detect when the decode stage outputs an instruction with the specific opcode (or other specific feature).

The end instruction execution detection logic 520 is configured to monitor one or more control signals and/or data signals of the hardware design 502 to detect when the symbolic instruction has been executed. As described above, in some examples a symbolic instruction is an instruction with a particular opcode. In these examples, the end instruction execution detection logic 520 may be configured to detect that the symbolic instruction has been executed when the instruction with the particular opcode has been executed. In other examples, the symbolic instruction may be defined by another property, such as instruction address or other identification information.

When the end instruction execution detection logic 520 detects the end event (i.e. that the symbolic instruction has been executed) the end instruction execution detection logic 520 may set a sampled out register 526 to indicate that the task (execution of the instruction) has been completed.

In some cases, the end instruction execution detection logic 520 is configured to only update the sampled out register 526 if the end event (i.e. execution of the symbolic instruction) is detected and the start event (i.e. the symbolic instruction has been fetched/decoded) has already been detected. The end instruction execution detection logic 520 may be configured to determine that the start event has been detected based on the status of the sampled in register 524. For example, in some cases, the end instruction execution detection logic 520 may be configured to only set the sampled out register 526 if the sampled in register 524 is set and the end event is detected.

Where the processor is a single-threaded, in-order processor, un-pipelined processor the processor processes a single instruction at a time the end instruction execution detection logic 520 may be configured to detect that the symbolic instruction has been executed when the processor fetches a new instruction. The following is example SVA code for implementing such end event detection logic where sampled_in is the sampled in register 524, current_state is the current state of the processor (e.g. fetching, decoding, executing), and sampled_out is the sampled out register 526:

```
always @(posedge clk or negedge resetn)
    if (!resetn)
        sampled_out <= 1'b0;
    else if (sampled_in && (current_state == fetch_new_instruction))
        sampled_out <= 1'b1;
```

It will be evident to a person of skill in the art that the above SVA code causes the sampled out register (sampled_out) to be set to zero after a reset (!resetn), and set to one if the processor is fetching a new instruction (current_state== fetch_new_instruction) and fetch/decode of the symbolic instruction has already been detected (sampled_in).

It will be evident to a person of skill in the art that this is an example only and the end instruction execution detection logic 520 may be configured to detect that the symbolic instruction has been executed in another manner. For example, in other examples where the processor is a pipelined processor, the end instruction execution detection logic 520 may be configured to monitor the output of an execution stage of the processor to detect when the execution stage outputs an instruction with the specific opcode (or other specific feature).

The counter update logic 522 is configured to count the number of clock cycles between the start event and the end event—i.e. between the symbolic instruction being fetched/decoded and the symbolic instruction being executed. In other words, the counter update logic 522 counts the number of clock cycles it takes for the processor to execute the symbolic instruction.

The counter update logic 522 may be configured to determine in each clock cycle whether the start event (i.e. fetch/decode of the symbolic instruction) has been detected (e.g. from the state of the sampled in register 524). If the start event (i.e. fetch/decode of the symbolic instruction) has been detected then the counter update logic 522 may be configured to determine whether the end event (i.e. execution of the symbolic instruction) has been detected (e.g. from the state of the sampled out register 526). If the end event (i.e. execution of the symbolic instruction) has not been detected then the counter update logic 522 may increment a counter 528. If, however, the end event has been detected then the counter update logic 522 does not increment the counter 528.

The following is example SVA code for implementing counter update logic 522 that is configured to increment the counter 528 for each clock cycle in which the sampled in register 524 is set and the sampled out register 526 is not set. In the example below sampled_in is the sampled in register 524, sampled_out is the sampled out register 526, and latency_counter is the counter 528:

```
always @(posedge clk or negedge resetn)
    if (!resetn)
        latency_counter <= {CNT_WIDTH{1'b0}};
    else if (sampled_in && !sampled_out)
        latency_counter <= latency_counter + 1'b1;
```

It will be evident to a person of skill in the art that the above SVA code causes the counter (latency_counter) to be set to zero after a reset (!resetn), and incremented by one if the sampled in register (sampled_in) is set and the sampled out register (sampled_out) is not set. It will be evident to a person of skill in the art that this is an example only and the counter update logic 522 may be configured to update the counter in another manner.

The property evaluation logic 516 evaluates (e.g. periodically, such as, each clock cycle) one or more properties related to the value of the counter 528 to assess the performance of the hardware design 502 in executing instructions. In some examples the property evaluation logic 516 may be configured to verify that the hardware design 502 executes instructions within a predetermined number of clock cycles. In these examples, the property evaluation logic may be configured to evaluate an assertion that asserts the counter is less than a predetermined number of clock cycles.

The following is example SVA code for implementing property evaluation logic 516 that evaluates an assertion that the counter is less than a predetermined number of clock cycles. In the example below latency_counter is the counter 528 and N is the predetermined number of clock cycles.

```
'define clk_rst @(posedge clk) disable iff (!resetn) assert
    property ('clk_rst latency_counter<N);
```

It will be evident to a person of skill in the art that the above causes the property evaluation logic to determine for each positive edge of the clock whether the counter (latency_counter) is less than the predetermined number of clock cycles (N). As described above, when a formal verification tool 112 formally verifies such an assertion it will verify for each possible symbolic instruction (e.g. each opcode) that the counter is less than N. If there is at least one state of the hardware design 502 where the counter is equal to or greater than N then the assertion will fail. Therefore formal verification of the assertion can exhaustively verify that the hardware design 502 executes all instructions within N clock cycles.

During formal verification of the assertion, the formal verification tool 122 typically stops the verification as soon as it finds a state of the hardware design 502 in which the assertion fails (i.e. a state in which the counter is greater than or equal to N). Accordingly, the formal verification tool 112 typically only provides information on the one state of the hardware design 502 it identified in which the assertion is not true. Therefore, in some cases, to get more granular feedback (or information) from the formal verification tool 112, the property evaluation logic 516 may be configured to evaluation a plurality of assertions which each assert that the property (e.g. the counter is less than N) is true for a particular symbolic instruction (e.g. a particular opcode). The formal verification tool 112 will then formally verify each assertion and provide feedback if any of the assertions fail. This allows the developer or engineer to know which types of instructions are problematic (e.g. not meeting the performance goal).

The following is example SVA code for implementing property evaluation logic 516 that is configured to evaluate an assertion for each possible opcode (in this case there are 64 possible opcodes) that asserts that when the opcode of the symbolic instruction is that possible opcode the counter is less than a predetermined number of clock cycles. In the example below latency_counter is the counter 528 and N is the predetermined number of clock cycles.

```
'define clk_rst @(posedge clk) disable iff (!resetn)
genvar i;
generate for (i=0;i<64;i++) begin: inst_latency
    as_latency_check:
        assert property ('clk_rst (watched_instruction ==
i) |-> (latency_counter < N));
    end
endgenerate
```

It will be evident to a person of skill in the art that the above SVA code causes the property evaluation logic to generate sixty-four assertions that each assert that when the opcode is a particular value then the counter (latency_counter) is less than the predetermined number of clock cycles (N). Formal verification of such a set of assertions can be used to not only prove that the hardware design 502 executes all instructions within a predetermined number of clock cycles, but, it can also provide granular feedback of which types of instructions are not being executed within the predetermined number of clock cycles.

In other examples, the property evaluation logic 516 may be configured to identify performance metrics (e.g. best and/or worst case performance) of the hardware design 502 in executing instructions. For example, where the hardware monitor 500 is being used to identify the maximum number of clock cycles to execute instructions then the property evaluation logic 516 may be configured to evaluate a plurality of covers each of which state that the counted number of clock cycles is equal to a different number within a range of numbers. For example, the property evaluation logic 516 may be configured to evaluate a cover that states the counter is equal to 20, a cover that states the counter is equal to 21, a cover that states that the counter is equal to 22, and so on up to a counter that states the counter is equal to 30. In this way, if the worst case performance is likely to be between 20 and 30 the exact number between 20 and 30 can be identified.

The following is example SVA code for implementing property evaluation logic 516 that is configured to evaluate a plurality of covers which each state the counter is equal to a specific value between 0 and 99 to identify the maximum number of clock cycles to execute an instruction. In the example latency_counter is the counter 528.

```
`define clk_rst @(posedge clk) disable iff (!resetn)
genvar N;
generate for (N=0;N<100;N++) begin
    cover property (`clk_rst latency_counter == N)
end
endgenerate
```

It will be evident to a person of skill in the art that the above SVA code causes the property evaluation logic 516 to generate one hundred covers that state that the counter (latency_counter) is equal to a different value between 0 and ninety-nine. Formal verification of such a set of covers can be used to identify the maximum number of clock cycles it takes the hardware design 502 to execute any instruction with any opcode. In particular, as described above, for a covered property the formal verification tool 112 searches the state space of the hardware design 102 to identify a state in which the property is true.

It will be evident to a person of skill in the art that a similar set of covers could be used to identify the minimum number of clock cycles it takes the hardware design 502 to execute any instruction with any opcode. Specifically, in order to determine the minimum number of clock cycles each of the covers would be ANDed with the sampled out register. In this case the lowest cover which passes is the minimum number of clock cycles.

Figure 6:
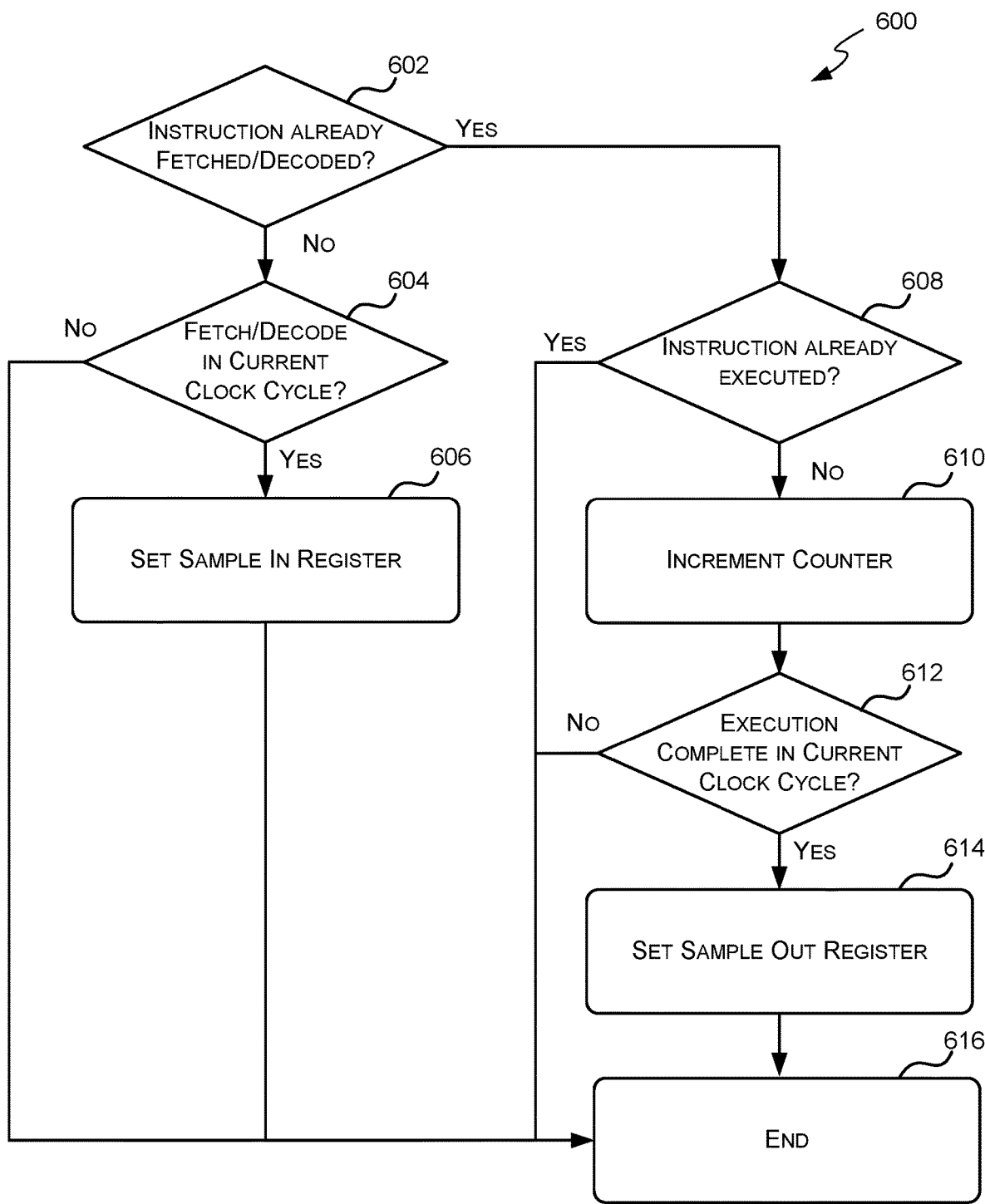
FIG. 6 is a flow diagram of an example method for assessing, using the hardware monitor of FIG. 5, the performance of a hardware design for a processor to execute instructions.

Reference is now made to FIG. 6 which illustrates an example method 600 for assessing the performance of a hardware design for a processor in executing instructions, which may be implemented by the hardware monitor 500 of FIG. 5 each clock cycle. The method 600 generally corresponds to method 400 of FIG. 4.

The method 600 begins at block 602 where the start instruction execution detection logic 518 determines whether the symbolic instruction has already been fetched (or decoded) (e.g. based on the state of the sampled in register 524).

If the symbolic instruction has not already been fetched (or decoded) then at block 604, the start instruction execution detection logic 518 determines whether the symbolic instruction has been fetched (or decoded) in the current clock cycle (e.g. based on one or more control signals and/or data signals of the processor). If the start instruction execution detection logic 518 determines that the symbolic instruction has been fetched/decoded in the current clock cycle then at block 606 the sampled in register 524 is set to indicate the start event has been detected, otherwise the method 600 ends 616.

If the symbolic instruction has already been fetched then at block 608, the end instruction execution detection logic 520 determines whether the symbolic instruction has already been executed (e.g. based on the sampled out register 526). If the symbolic instruction has already been executed then the method 600 ends 616.

If, however, the symbolic instruction has not already been executed then at block 610 the counter update logic 522 increments the counter 528 to indicate that one more clock cycle has elapsed since the symbolic instruction has been fetched (or decoded). Then at block 612 the end instruction execution detection logic 520 determines whether the symbolic instruction has been executed in the current clock cycle (e.g. based on one or more control signals and/or data signals of the processor). If the symbolic instruction has not been executed in the current clock cycle then the method 600 ends 616. Otherwise, at block 614 the end instruction execution detection logic 520 sets the set sampled out register 526 to indicate that an end event has been detected. The method 600 then ends 616.

Although the above examples describe using a hardware monitor 106 or 500 to assess performance of a hardware design 102 or 502 in completing a task by formally verifying the properties defined in the hardware monitor 106 or 500 using a formal verification tool 112, in other examples the hardware monitor 106 or 500 (including the properties defined therein) may be synthesised into hardware (e.g. an integrated circuit) as part of, or in connection with, the hardware design 102 or 502. In these examples the properties of the hardware monitor 106 or 500 act as a monitor during operation of the hardware (e.g. integrated circuit 104 or processor 504). In particular, during operation of the hardware (e.g. integrated circuit 104 or processor 504) the hardware monitor 106 or 500 evaluates the properties (e.g. upon the positive edge of the clock signal).

When a hardware monitor 106, 500 is implemented in hardware any symbolic variable is typically implemented by a register which has a fixed value during operation. The fixed value may be randomly assigned each time the hardware monitor 106 or 500 is reset. For example, where a symbolic opcode represents the possible opcodes, the symbolic opcode may be assigned opcode 0 after a first reset of the hardware monitor 106 or 500, and the symbolic opcode may be assigned opcode 3 after a second reset of the hardware monitor 106 or 500. Accordingly, after the first reset, the hardware monitor 106, 300, 500, or 700 monitors instructions with opcode 0, and after the second reset, the hardware monitor 106, or 500 monitors instructions with opcode 3.

Where the hardware monitor 106 or 500 is implemented in hardware the hardware monitor 106 or 500 may be configured to output information indicating whether or not the properties are true or not. For example, the hardware monitor 106 or 500 may be configured to, upon detecting that an asserted property has failed (or is not true), output information indicating that the assertion has failed and/or the state at which the assertion failed. Similarly, the hardware monitor 106 or 500 may be configured to, upon detecting that a covered property is valid (or is true), output information indicating that the cover is true and/or the state at which the cover was true.

The output information can provide an assessment of the performance of the hardware design in completing the task. For example, the information may: indicate that the hardware design does or does not meet a performance goal; and/or identify a performance metric (e.g. the minimum number of clock cycles to complete the task and/or the maximum number of clock cycles to complete the task). This can improve observability by being able to identify a performance issue as soon as it is triggered. Without such properties performance issues may only be identified in simulation-based verification or during operation if it propagates to an observable output and then it is only evident at the end of the simulation. By using one or more properties, performance can be checked and assessed instantly, at its source.

Figure 7:
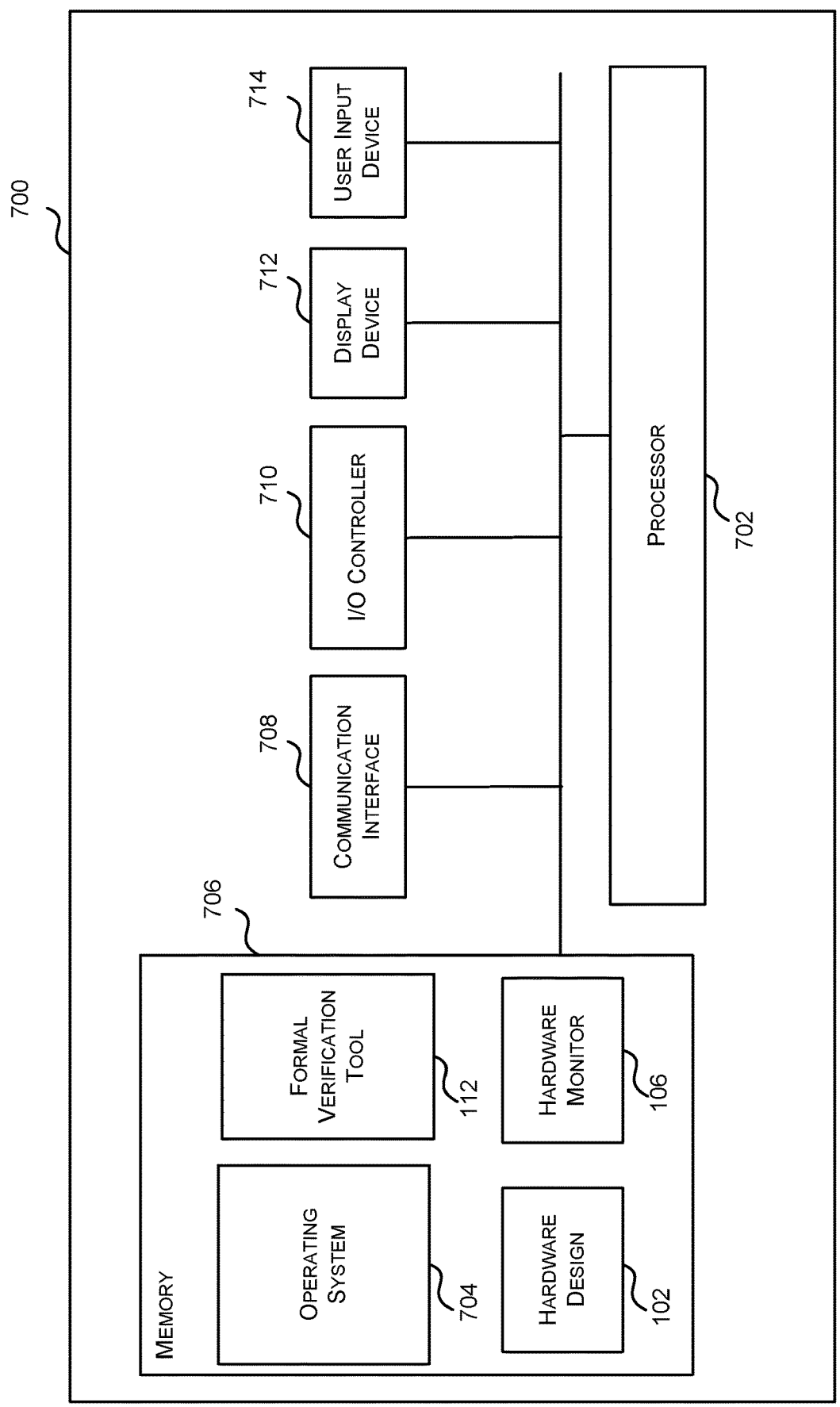
FIG. 7 is a block diagram of an example computing-based device.

FIG. 7 illustrates various components of an exemplary computing-based device 700 which may be implemented as any form of a computing and/or electronic device, and in which embodiments of the systems, methods and hardware monitors described above may be implemented.

Computing-based device 700 comprises one or more processors 702 which may be microprocessors, controllers or any other suitable type of processors for processing computer executable instructions to control the operation of the device in order to assess the performance of a hardware design in completing a task. In some examples, for example where a system on a chip architecture is used, the processors 702 may include one or more fixed function blocks (also referred to as accelerators) which implement a part of the method of assessing the performance of a hardware design in completing a task in hardware (rather than software or firmware). Platform software comprising an operating system 704 or any other suitable platform software may be provided at the computing-based device to enable application software, such as a formal verification tool 112, to be executed on the device.

The computer executable instructions may be provided using any computer-readable media that is accessible by computing based device 700. Computer-readable media may include, for example, computer storage media such as memory 706 and communications media. Computer storage media (i.e. non-transitory machine readable media), such as memory 706, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 706) is shown within the computing-based device 700 it will be appreciated that the storage may be distributed or located remotely and accessed via a network or other communication link (e.g. using communication interface 708).

The computing-based device 700 also comprises an input/output controller 710 arranged to output display information to a display device 712 which may be separate from or integral to the computing-based device 700. The display information may provide a graphical user interface. The input/output controller 710 is also arranged to receive and process input from one or more devices, such as a user input device 714 (e.g. a mouse or a keyboard). This user input may be used to, for example, initiate formal verification of the properties define din the hardware monitor 106. In an embodiment the display device 712 may also act as the user input device 714 if it is a touch sensitive display device. The input/output controller 710 may also output data to devices other than the display device, e.g. a locally connected printing device (not shown in FIG. 7).

The hardware monitors of FIGS. 3 and 5 are shown as comprising a number of functional blocks. This is schematic only and is not intended to define a strict division between different logic elements of such entities. Each functional block may be provided in any suitable manner. It is to be understood that intermediate values described herein as being formed by a hardware monitor need not be physically generated by the hardware monitor at any point and may merely represent logical values which conveniently describe the processing performed by the hardware monitor between its input and output.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

As described above a hardware design, which also may be referred to herein as an integrated circuit definition data set, describes an integrated circuit to perform one or more tasks. The hardware design may be implemented in software, such as HDL (hardware description language). Accordingly, there may be provided a computer readable storage medium having encoded thereon computer readable program code in the form of an integrated circuit definition dataset (e.g. hardware design) that when processed in an integrated circuit manufacturing system configures the system to manufacture an integrated circuit to perform the one or more tasks.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an integrated circuit will now be described with respect to FIG. 8.

Figure 8:
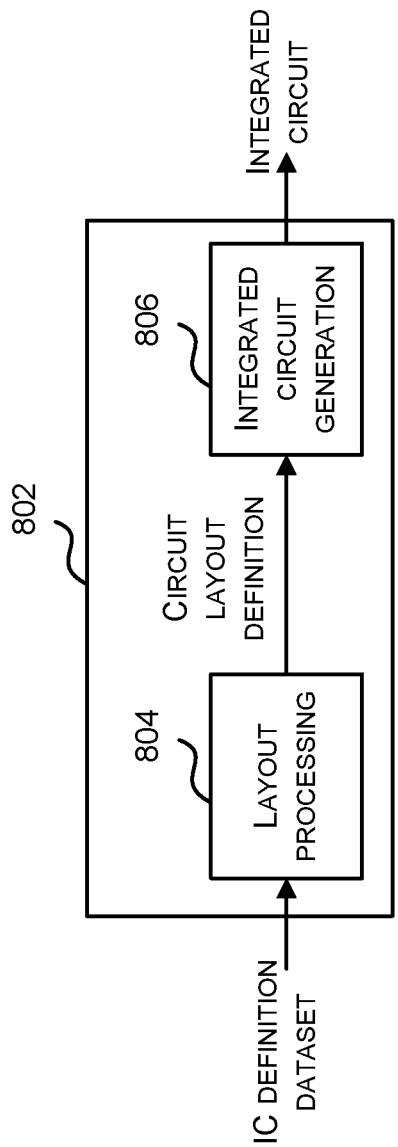
FIG. 8 is a block diagram of an example integrated circuit manufacturing system.

FIG. 8 shows an example of an integrated circuit (IC) manufacturing system 802 which comprises a layout processing system 804 and an integrated circuit generation system 806. The IC manufacturing system 802 is configured to receive an IC definition dataset (e.g. a hardware design 102 or 502 defining an integrated circuit to perform one or more tasks), process the IC definition dataset, and generate an IC according to the IC definition dataset (e.g. hardware design 102 or 502). The processing of the IC definition dataset configures the IC manufacturing system 802 to manufacture an integrated circuit to perform one or more tasks.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described herein to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A hardware monitor arranged for use with a formal verification tool to assess performance of a hardware design for an integrated circuit to complete a set of tasks, the hardware monitor comprising:
   monitoring and counting logic configured to:
      monitor one or more control signals and/or data signals of an instantiation of the hardware design to identify start and completion of a symbolic task by the instantiation of the hardware design, the symbolic task representing the set of tasks; and
      count a number of cycles between the start and the completion of the symbolic task; and
   property evaluation logic configured to evaluate one or more formal properties related to the counted number of cycles to assess the performance of the instantiation of the hardware design in completing the symbolic task.

2. The hardware monitor of claim 1, wherein the one or more formal properties related to the counted number of cycles are configured such that evaluation of the one or more formal properties determines whether the instantiation of the hardware design completes the symbolic task within a predetermined number of cycles.

3. The hardware monitor of claim 1, wherein the one or more formal properties related to the counted number of cycles are configured such that evaluation of the one or more formal properties identifies one or more performance metrics of the instantiation of the hardware design in completing the symbolic task.

4. The hardware monitor of claim 3, wherein the one or more formal properties comprises one or more covered properties that state that the counted number of cycles is equal to a particular number of cycles.

5. The hardware monitor of claim 3, wherein the one or more formal properties comprise a plurality of covered properties that each state that the counted number of cycles is equal to a different number of cycles.

6. The hardware monitor of claim 1, wherein the one or more formal properties comprises one or more asserted properties that state that the counted number of cycles is less than a predetermined number.

7. The hardware monitor of claim 6, wherein the one or more formal properties comprises an asserted property for each task of the set of tasks that states that if the symbolic task is that task the counted number of cycles is less than a predetermined number.

8. The hardware monitor of claim 1, wherein the monitoring and counting logic comprises:
   start event detection logic configured to monitor the one or more control signals and/or data signals of the instantiation of the hardware design to detect the start of the symbolic task, and in response to detecting the start of the symbolic task set a sampled in register;

end event detection logic configured to monitor the one or more control signals and/or data signals of the instantiation of the hardware design to detect the completion of the symbolic task, and in response to detecting the completion of the symbolic task when the sampled in register is set, set a sampled out register; and counter update logic configured to increment a counter that represents the counted number of cycles when the sampled in register is set and the sampled out register is not set.

9. The hardware monitor of claim 1, wherein the integrated circuit forms a processor.

10. The hardware monitor of claim 9, wherein the monitoring and counting logic is configured to: detect the start of the symbolic task when a symbolic instruction has been fetched or decoded; and detect the completion of the symbolic task when the symbolic instruction has been executed.

11. The hardware monitor of claim 1, wherein when the hardware design is processed in an integrated circuit manufacturing system, the hardware design configures the integrated circuit manufacturing system to manufacture the integrated circuit.

* * * * *